US012752617B2

(12) United States Patent
Raffaelli et al.

(10) Patent No.: US 12,752,617 B2
(45) Date of Patent: Oct. 6, 2026

(54) SADDLE-RIDE MOTORCYCLE OF SCOOTER TYPE WITH HYBRID PROPULSION

(71) Applicant: Piaggio & C. S.p.A., Pontedera (IT)

(72) Inventors: Andrea Raffaelli, Pontedera (IT); Mario Donato Santucci, Pontedera (IT)

(73) Assignee: Piaggio & C. S.p.A., Pontedera (IT)

(*) Notice: Subject to any disclaimer, the term of this patent is extended or adjusted under 35 U.S.C. 154(b) by 280 days.

(21) Appl. No.: 18/698,456

(22) PCT Filed: Nov. 24, 2022

(86) PCT No.: PCT/IB2022/061395
§ 371 (c)(1),
(2) Date: Apr. 4, 2024

(87) PCT Pub. No.: WO2023/095057
PCT Pub. Date: Jun. 1, 2023

(65) Prior Publication Data

US 2024/0399847 A1 Dec. 5, 2024

(30) Foreign Application Priority Data

Nov. 24, 2021 (IT) ........................ 102021000029681

(51) Int. Cl.
*B60K 6/48* (2007.10)
*B60K 6/26* (2007.10)
(Continued)

(52) U.S. Cl.
CPC .................. *B60K 6/48* (2013.01); *B60K 6/26* (2013.01); *B60K 6/40* (2013.01); *B60K 6/543* (2013.01); *B62M 7/12* (2013.01); *B62K 2204/00* (2013.01)

(58) Field of Classification Search
CPC ... B60K 6/48; B60K 6/26; B60K 6/40; B60K 6/543; B60K 6/405; B60K 2204/00; B60W 2300/36; B60W 2300/365
(Continued)

(56) References Cited

U.S. PATENT DOCUMENTS 6,481,523 B1 * 11/2002 Noro .................... B62K 25/283 180/227
8,002,067 B2 * 8/2011 Nishiura .............. B62K 25/283 180/68.5
(Continued)

FOREIGN PATENT DOCUMENTS

JP H08175475 A 7/1996
WO 2009047806 A2 4/2009

*Primary Examiner* — Jason D Shanske
*Assistant Examiner* — Caitlin Anne Miller
(74) *Attorney, Agent, or Firm* — Patterson Intellectual Property Law, PC

(57) ABSTRACT

A saddle-ride motorcycle comprises a drive wheel and a hybrid-type propulsion unit. The propulsion unit comprises a thermal combustion engine which includes a drive shaft, a first transmission assembly mechanically connecting the drive shaft to the drive wheel and an electric machine which can be operated independently of/in combination with the thermal combustion engine. The propulsion unit further comprises a second transmission assembly mechanically connecting a rotor of the electric machine to the drive wheel and separated from the first transmission assembly. The motorcycle also comprises a support bracket shaped to rotatably support the drive wheel and having the electric machine mounted thereon. The rotation axis of the rotor of the electric machine is parallel with respect to a rotation axis of the drive wheel. Furthermore, the rotation axis of the rotor is placed in an offset position with respect to the rotation axis of the drive wheel.

19 Claims, 6 Drawing Sheets

(51) Int. Cl.
*B60K 6/40* (2007.10)
*B60K 6/543* (2007.10)
*B62M 7/12* (2006.01)

(58) Field of Classification Search
USPC .............................................. 180/65.21, 65.1
See application file for complete search history.

(56) References Cited

U.S. PATENT DOCUMENTS

| | | | | |
|---|---|---|---|---|
| 9,027,692 | B2 * | 5/2015 | Nakashima | F16D 51/20<br>180/220 |
| 12,194,855 | B2 * | 1/2025 | Cappellini | B60K 6/40 |
| 2010/0270098 | A1 * | 10/2010 | Buell | F01N 13/001<br>180/296 |
| 2012/0000720 | A1 * | 1/2012 | Honda | B62K 11/10<br>180/65.1 |
| 2012/0325571 | A1 * | 12/2012 | Nomura | B60K 6/48<br>903/902 |
| 2013/0168171 | A1 * | 7/2013 | Buell | B60K 6/46<br>180/65.245 |
| 2019/0225070 | A1 * | 7/2019 | Gassmann | B60K 6/48 |

* cited by examiner

SADDLE-RIDE MOTORCYCLE OF SCOOTER TYPE WITH HYBRID PROPULSION

FIELD OF THE INVENTION

The present invention falls within the scope of manufacturing saddle-ride vehicles. In particular, the invention relates to a two or three-wheeled vehicle provided with a hybrid propulsion unit or comprising a thermal engine and an electric machine, preferably reversible so as to be used as an electric motor, to increase the torque available to the drive wheel, or as a generator to recharge a battery pack connected to the same electric machine.

PRIOR ART

Over the last few years, two or three-wheeled motor vehicles with hybrid propulsion have been proposed, wherein an electric machine is added to the common internal combustion engine. The purpose of this type of propellers is substantially to exploit the internal combustion engine at the points of high efficiency and to recover energy, through the electric machine during the deceleration and braking phases, and in the case to exploit the electric machine as the only propeller. The general object of hybrid propulsion is to reduce the emissions of pollutants that accompany the operation of internal combustion engines.

An example of a two-wheeled motorcycle with hybrid propulsion is described and shown in the patent EP1572486 in the name of the same Applicant. In particular, EP1572486 relates to a scooter type vehicle. As is known, compared to other vehicles, a scooter is distinguished by the presence of a substantially open frame in the central area and of a footboard which as a whole allow the motorcyclist to maintain a riding position with a straight torso with the legs close together and parallel. In a scooter, the internal combustion engine is not installed on the frame, but rather is part of the rear suspension. In fact, the internal combustion engine is integral with a support arm (swingarm) which supports the rear wheel and which is pivoted to the frame through a fulcrum. The latter allows the arm to swing with respect to the frame following the loads imposed on the rear suspension. One or more shock absorbers between the frame and the support arm complete the rear suspension.

In the solution described in EP1572486 in the name of the same Applicant, a transmission of the CVT type is provided interposed between the shaft of the thermal engine and a propulsion shaft; this CVT transmission comprises a driving pulley keyed to the shaft of the internal combustion engine and a driven pulley keyed to a transmission shaft connected, via a pair of gears, to the rear wheel. The CVT transmission comprises a clutch operatively interposed between the driven pulley and the transmission shaft, wherein this clutch comprises a first clutch element connected to the driven pulley and a second bell-shaped clutch element connected to the transmission shaft. In the solution of EP1572486 there is also provided an electric machine whose rotor is connected to the (bell-shaped) engine element through coupling means interposed between the driven pulley and the first clutch element so as to selectively connect these two elements or so as to allow, or not, the insertion of the electric machine in the transmission.

U.S. Pat. No. 5,193,634 discloses another hybrid propulsion system for a motorcycle which can in part be traced back to the one described above. In fact, there is still a CVT transmission provided with a clutch which allows, or not, the transmission of the motion generated by the internal combustion engine to the rear drive wheel. In this case, the output shaft of the electric machine is connected to the transmission shaft through a transmission such that the torque generated by the electric motor is transmitted to the transmission shaft only if the speed of the electric motor is higher than that of the same transmission shaft.

The Applicant has found that the solutions described above, while effective in terms of operation, have a rather complex configuration which strongly affects the design and construction costs. In the case, for example, of the solution described in EP1572486, the electric machine is strongly integrated with the transmission which connects the internal combustion engine to the rear wheel. This leads to a "rigid" production line, that is dedicated solely to the assembly of the hybrid system and can therefore only be used to manufacture a single model of scooter. Therefore, the known solutions are characterized by severe limitations in terms of production versatility.

Again with reference to the solution described in EP1572486, the configuration of the hybrid system provides that the torque is transmitted from the transmission shaft to the drive wheel through the same gear train, regardless of the device (thermal engine or electric machine) which generates this torque. In particular, this gear train develops an optimized reduction gear ratio for the transmission from the thermal engine and with reference to which the electric machine, in the parallel hybrid operating mode, must adapt. This means that the electric machine does not always operate in optimal operating conditions.

SUMMARY

The main task of the present invention is to provide a saddle-ride vehicle which allows the drawbacks indicated above to be overcome, or at least contained. Within the scope of this task, a first object of the present invention is to provide a saddle-ride vehicle with hybrid propulsion which, with respect to known solutions, can be assembled in a simpler and more versatile way. Another object of the present invention is to provide a hybrid propulsion saddle-ride vehicle in which the operation of the internal combustion engine and of the electric machine can be optimized in terms of torque transmission to the drive wheel. Last but not least, an object of the present invention is to provide a saddle riding vehicle which is reliable and easy to be implemented in a cost-effective manner.

The Applicant has found that the abovementioned tasks and objects can be achieved by providing two independent, i.e. physically separated, transmission assemblies, one to transmit the driving torque generated by the thermal engine to the rear wheel and the other to mechanically connect the electric machine to the same rear wheel. In particular, the aforementioned tasks and objects are achieved by a saddle-ride motorcycle comprising at least one drive wheel and a propulsion unit of the hybrid type. Such a unit comprises a thermal combustion engine which includes a drive shaft, a first transmission assembly which mechanically connects said drive shaft to said at least one drive wheel and an electric machine which can be operated independently of or in combination with the thermal combustion engine. The propulsion unit comprises a second transmission assembly that mechanically connects a rotor of the electric machine to a drive wheel. According to the invention, the second transmission assembly is separated from the first transmission assembly. The term "separate" indicates a condition whereby the two transmission assemblies are physically disconnected, i.e. such that no component of the second transmission assembly is common to the first transmission assembly and vice versa. In other words, no component of the second transmission assembly is arranged/used to transfer the torque generated by the thermal engine to the drive wheel. Therefore, no component of the first transmission assembly is arranged/used to transfer the torque generated by the electric machine to the drive wheel itself.

From the production point of view, the first transmission assembly can therefore be installed/assembled along a first line which is wholly independent of a second line which can be used to install/assemble the second transmission assembly. It follows that said first line can also be used for the production of motor vehicles with only thermal propulsion, i.e. for models which do not provide for an electric machine.

According to the invention, the motorcycle comprises a support bracket which rotatably supports said drive wheel, wherein said support bracket is integral with the internal combustion engine and also supports the electric machine. In particular, the rotation axis of the rotor of the electric machine is parallel to the rotation axis of the drive wheel. Furthermore, the rotation axis of the rotor of the electric machine is located, in a side view of the motorcycle, in an offset position with respect to the rotation axis of the drive wheel. In other words, the rotation axis of the electric machine is offset with respect to the rear drive wheel axis. The rotation axis of the electric machine is therefore spaced by a predetermined distance with respect to the rotation axis of the drive wheel.

In particular, the support bracket extends longitudinally starting from the engine block until at least the rotation axis of the drive wheel. Thus, the support bracket forms a support for the drive wheel pin and at the same time a fixed support for the electric machine.

Preferably, the support bracket comprises a housing seat for the drive wheel pin, so as to support it in a rotatable manner.

According to a possible embodiment, the support bracket is advantageously made in a single piece.

In one possible embodiment thereof, the support bracket is configured to further support a muffler.

According to a possible embodiment, the rotation axis of the rotor is placed in a rear position with respect to the rotation axis of the drive wheel.

Advantageously, a first plane containing the rotation axis of the drive wheel, a second plane containing the rotation axis of the rotor of the electric machine and a third plane containing the axis around which the motor swings with respect to the frame are defined. Preferably, with respect to a front-rear direction, the first plane is comprised between the second and third planes defined above.

In particular, the three indicated planes are parallel to each other. Consequently, the rotation axis of the rotor of the electric machine, the rotation axis of the drive wheel and the axis around which the motor swings with respect to the frame, are rotation axes parallel to each other transversely with respect to a longitudinal extension direction of the motorcycle.

According to an embodiment, the first transmission assembly comprises an automatic transmission with continuous variation of the transmission ratio (indicated as a transmission of the CVT—Continuously Variable Transmission type) which connects the drive shaft to a transmission shaft mechanically connected to the drive wheel; this CVT-type transmission comprises a drive pulley and a driven pulley, respectively connected to the drive shaft and to the transmission shaft. Said first transmission assembly comprises a clutch operatively interposed between the driven pulley and the transmission shaft.

According to a possible embodiment, the first transmission assembly comprises a gear transmission which connects the transmission shaft to said at least one drive wheel.

According to an embodiment, the second transmission assembly comprises a second gear transmission.

According to a preferred embodiment, the first transmission assembly and the second transmission assembly are arranged on opposite sides with respect to a longitudinal plane of said motorcycle orthogonal to the rotation axis of the drive wheel.

According to a preferred embodiment, the first transmission assembly develops a transmission ratio, between the drive shaft and the drive wheel, different from the transmission ratio developed by the second transmission assembly between the rotor of the electric machine and the drive wheel.

Preferably, said support bracket defines a seat in which the second transmission assembly is housed.

According to a possible embodiment, the electric machine is reversible and is connected to a battery of the motorcycle so as to charge the battery itself in at least one operating mode of said electric machine. In particular, the electric machine can generate electric current in the deceleration or braking phase, exploiting the inertia of the vehicle, or in acceleration, for example if the motorcycle must then cross a route in pure electric mode, such as a city restricted traffic area, and needs to fully recharge the battery.

LIST OF FIGURES

Further features and advantages of the invention will become clearer from the examination of the following detailed description of some preferred, but not exclusive, embodiments of the saddle-ride vehicle, illustrated by way of non-limiting example, with the aid of the accompanying drawings, in which.

The same reference numerals and letters in the figures identify the same elements or components.

DETAILED DESCRIPTION

With reference to the aforementioned figures, the present invention therefore relates to a saddle-ride vehicle, meaning by this expression any two-wheeled motorbike or motorcycle having at least two wheels, i.e. at least one front wheel and at least one rear wheel. Therefore, also motorcycles with three wheels, having two front steering wheels and a rear drive wheel or alternatively a front steering wheel and a pair of rear drive wheels, also fall within this definition. The definition of saddle-ride vehicle also includes quadricycles having, for example, two front steering wheels and two rear drive wheels. Hereinafter, the saddle-ride vehicle 1 will also be indicated with the expression motorcycle 1.

Hereinafter, reference will be made in particular to a two-wheeled motorcycle, but the following considerations are also valid for a three-wheeled motorcycle having a rear drive wheel and two steering and tilting front wheels.

Figure 1:
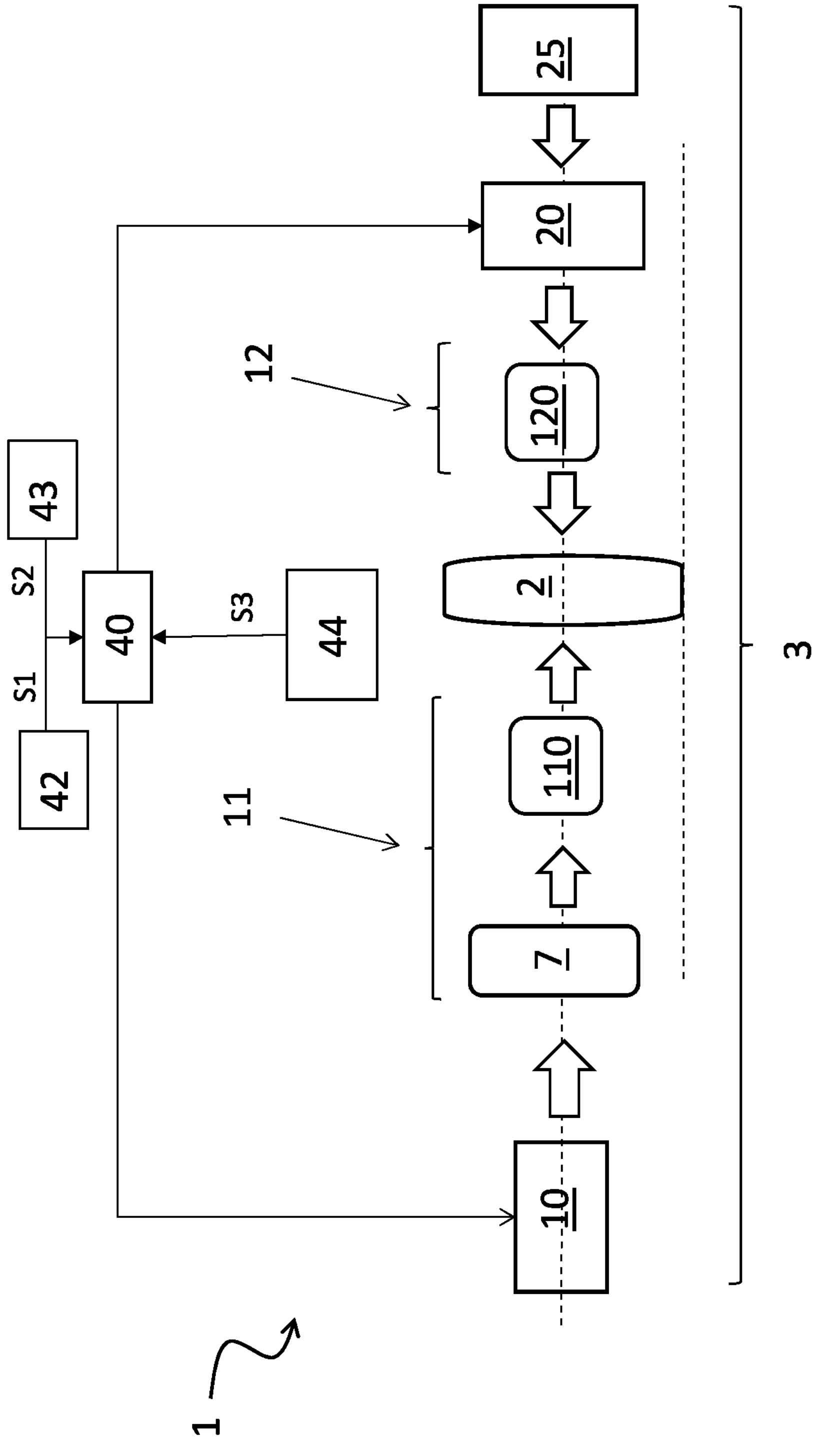
FIG. 1 is a block diagram of a saddle-ride vehicle according to the present invention.
Figure 2:
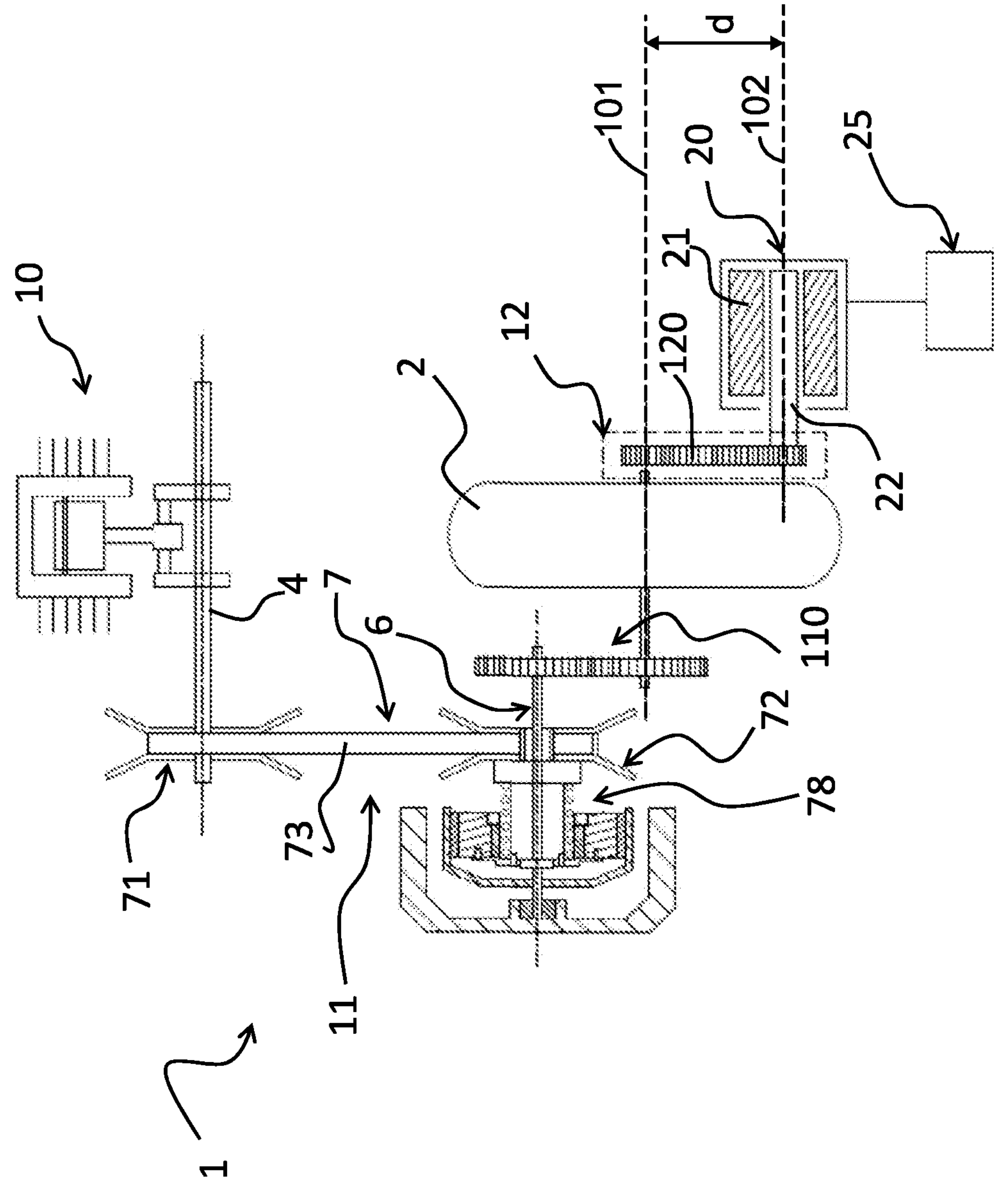
FIG. 2 is a schematic view relating to a saddle-ride vehicle according to the present invention.

FIGS. 1 and 2 are schematic views relating to a possible embodiment of a motorcycle 1 according to the invention. This comprises a hybrid-type propulsion unit 3 which includes an internal combustion engine 10 and an electric machine 20 connected to an electric battery 25 of the motorcycle 1. Preferably, the electric machine 20 is of the reversible type so as to operate as an electric motor or alternatively as an electric generator to recharge the battery 25.

The thermal engine 1 comprises a drive shaft 4 connected to the drive wheel 2 through a first transmission assembly 11 (see FIG. 2). The electric machine 20 comprises a stator 21 and a rotor 22, wherein the rotor 22 is connected to the drive wheel 2 through a second transmission assembly 12. For the purposes of the present invention, the expression "transmission assembly" generically indicates the set of components which allow the transmission of the torque generated by one of the two propulsion devices (thermal engine 10 or electric machine 20) to the drive wheel 2. According to the present invention, the second transmission assembly 12 is separated from the first transmission assembly 11. The term "separated" is intended to indicate a condition whereby the second transmission assembly 12 is physically disconnected, i.e. external and not integrated with the first transmission assembly 11. Therefore, no component of the first transmission assembly 11 is common to the second transmission assembly 12 and vice versa. It has been seen that this solution is particularly advantageous in terms of production, since a first production line provided for the assembly/installation of the first transmission assembly 11 can be designed so as to be completely independent from a second line provided for the assembly/installation of the second transmission assembly 12. Therefore, within the same range of motorcycles (for example scooters), the first production line can also be used for the production of a motorcycle with only thermal propulsion, i.e. without providing for the electric machine.

According to a preferred embodiment of the invention schematically shown in FIG. 2, the first transmission assembly 11 comprises a continuously variable transmission 7 (or also CVT-type transmission) which connects the drive shaft 4 to a transmission shaft 6 in its turn mechanically connected to the drive wheel 2. The CVT-type transmission can assume a known configuration. In the case schematized in FIG. 2, for example, the transmission 7 comprises a first pulley 71 (or drive pulley 71) and a second pulley 72 (or driven pulley 72) connected and coaxial respectively to the drive shaft 4 and to the transmission shaft 6. These pulleys 71, 72 are connected to a flexible transmission element 73 (for example a V-belt). The first transmission assembly 11 also comprises a centrifugal clutch 78 operatively interposed between the second pulley 72 and the transmission shaft 6 according to a principle known per se to a person skilled in the art and for this reason not described below.

In one embodiment (not shown) it is provided that the motorcycle 1 comprises a further clutch arranged between the electric machine 20 and the rotation axis of the drive wheel 2. This further clutch can be of the centrifugal or front-engagement type, and allows disconnection of the electric machine 20 when a predetermined speed of the motorcycle 1 is exceeded, to increase the efficiency of the propulsion unit 3 when it operates in purely thermal mode.

The transmission shaft 6 of the first transmission assembly 11 is connected to the drive wheel 2 through a first gear transmission 110 which develops a first transmission ratio in reduction. According to an embodiment, the second transmission assembly 12 comprises a second gear transmission 120 which connects the rotor of the electric machine 20 to the drive wheel 2. This second gear transmission 120 is configured so as to develop a second transmission ratio, also in reduction. Preferably, the second transmission ratio is different from the first transmission ratio developed by the first gear transmission 110 of the first transmission assembly 11. Advantageously, the physical separation between the two transmission assemblies 11, 12 allows the two gear transmissions 110, 120 mentioned above to be designed so as to optimize the operation of the thermal engine 10 and of the electric machine 20.

Figure 3:
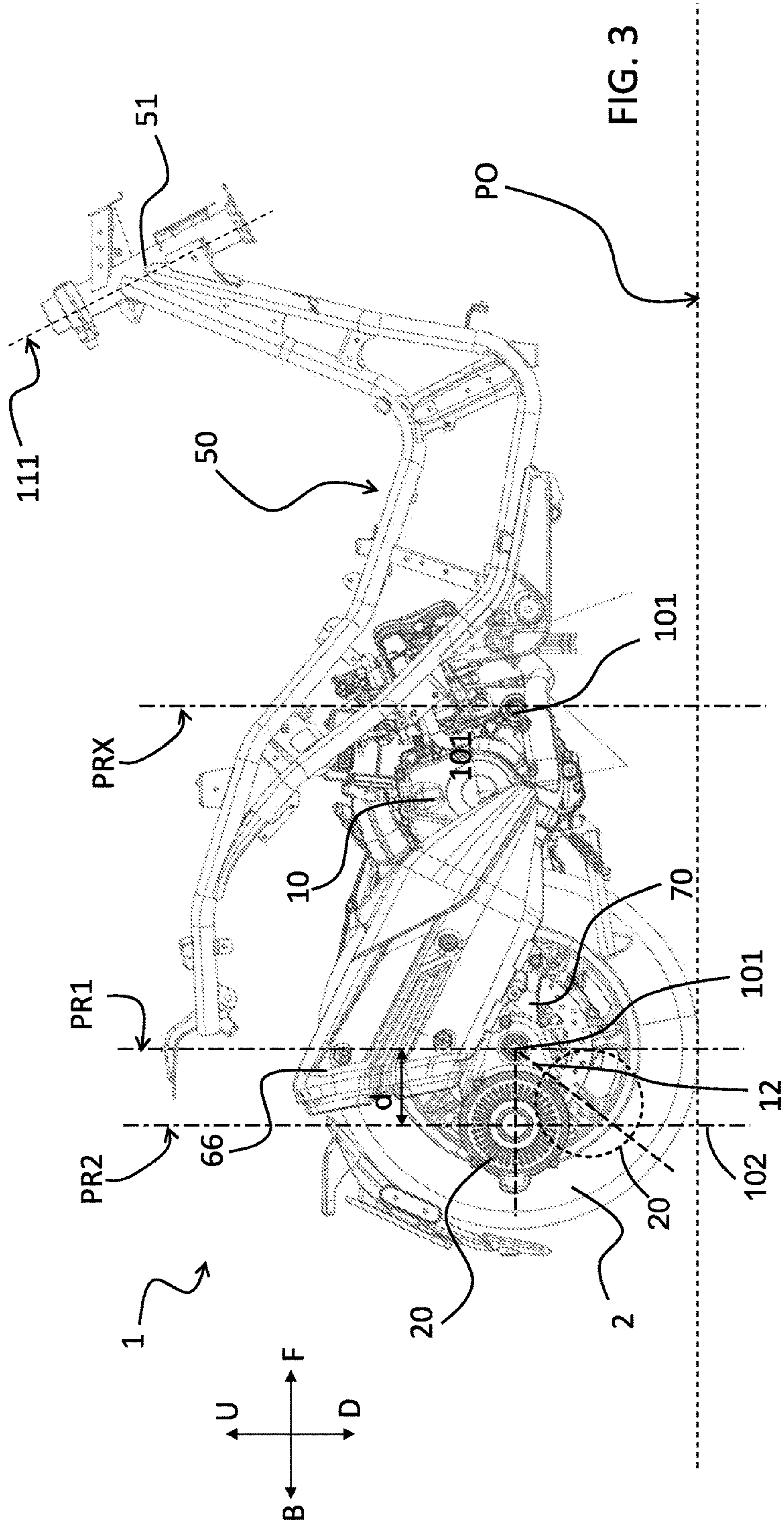
FIG. 3 is a lateral view of a part of a saddle-ride vehicle according to the present invention.
Figure 4:
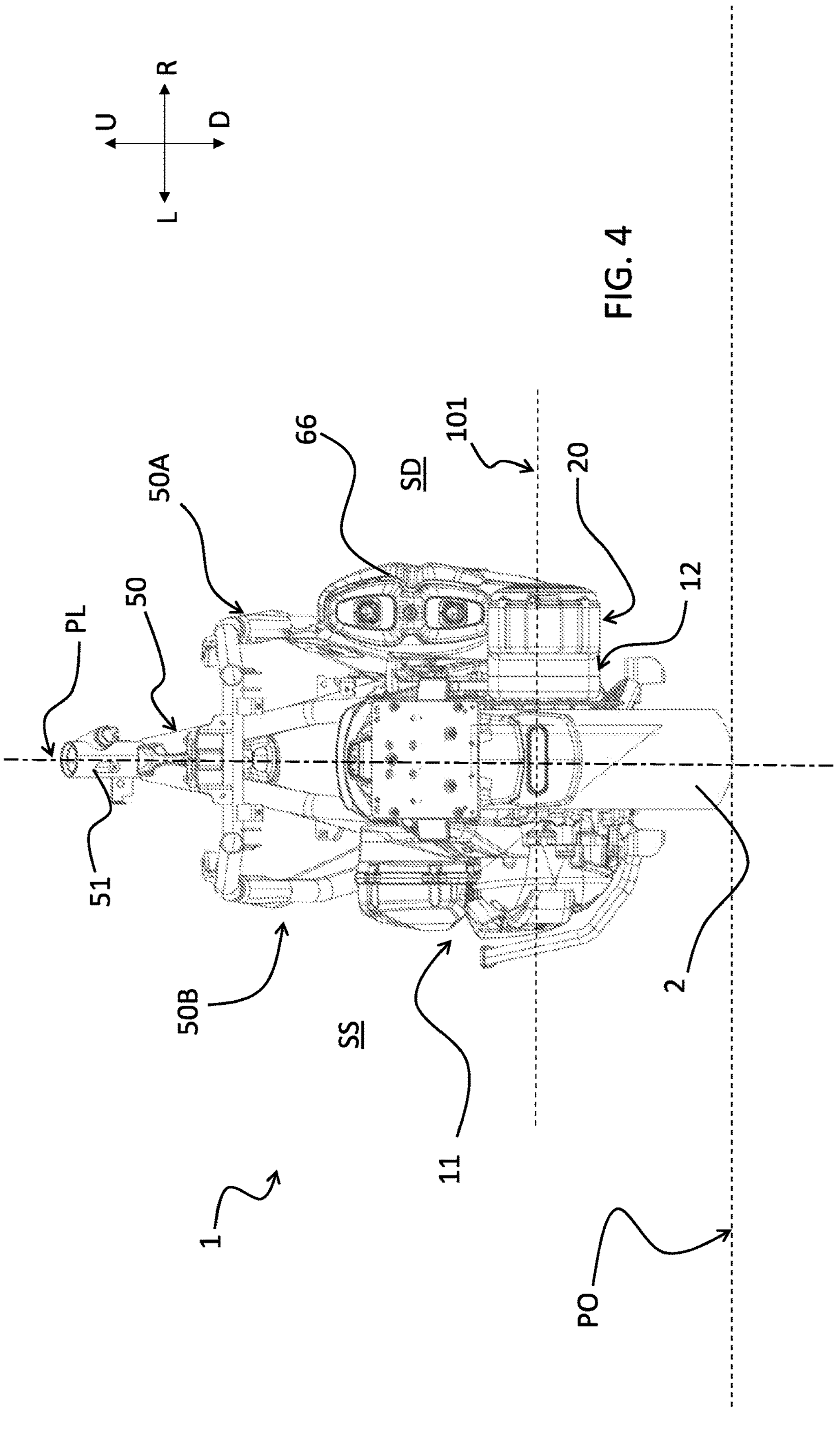
FIGS. 4 and 5 are a rear and plan view, respectively, of the saddle-ride vehicle of FIG. 3.
Figure 5:
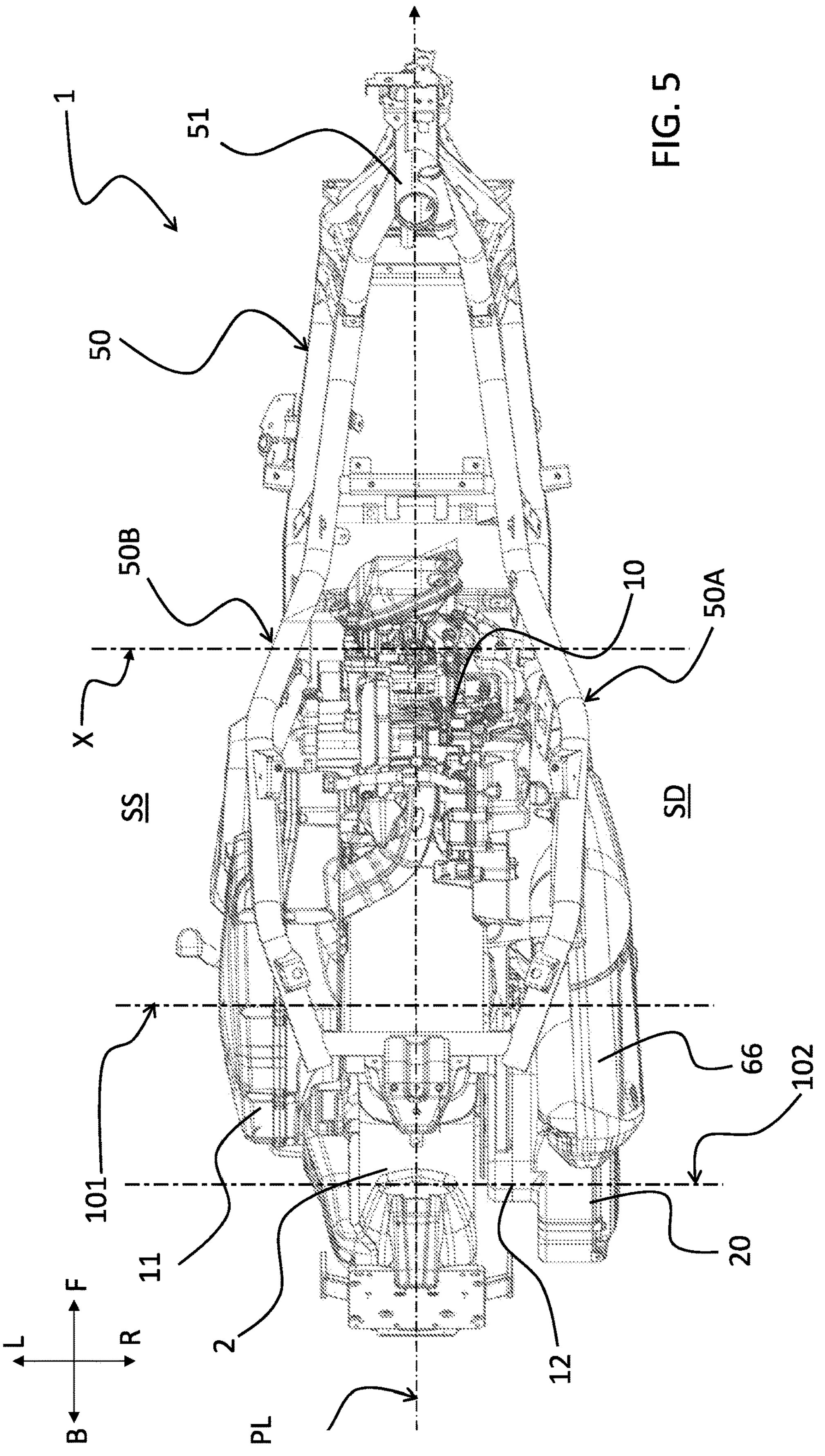

FIGS. 3 to 5 are views relating to a motorcycle 1 of the scooter type according to the present invention. For the purposes of the present invention, the expression "longitudinal direction" or "front-rear direction" means a direction parallel to the forward direction of the motorcycle 1 and orthogonal to the axis of rotation M of the drive wheel 2, while with the expression "transverse direction" or "right-left" direction is meant to indicate a direction substantially orthogonal to the longitudinal direction and parallel to the axis of rotation M of the drive wheel 2. Finally, the expression "normal direction" or "up-down" direction indicates a direction orthogonal to the longitudinal direction and to the transverse direction. The figures include Cartesian reference axes indicating the front-back direction F-B, the up-down direction U-D and the right-left direction R-L defined above.

The terms "longitudinally or longitudinal", the terms "transversely or transversely" and the terms "normally or normal" refer respectively to the longitudinal direction, i.e. front-back F-B, to the transverse direction, i.e. right-left R-L, and to the normal direction, i.e. up-down U-D. The terms "frontally", "left" and "above" refer to the lines indicated by the arrows of the half-lines F, L and U visible in the figures. The terms "rearly", "right" and "inferiorly" instead indicate opposite lines to those indicated by the arrows of the half-lines B, R and D.

In the motorcycle 1 of FIGS. 3 to 5 a frame 50 is identified to which the thermal engine 10 is pivoted through a fulcrum defining an oscillation axis X in the transverse direction, therefore parallel to the rotation axis 101 of the drive wheel 2 (see FIG. 5). In the front part, the frame 50 comprises a steering column 51 which identifies a steering axis 111 (see FIG. 3). The term longitudinal plane PL is intended to indicate a reference plane orthogonal to the axis of the drive wheel 2 and including said steering axis 111.

In a preferred embodiment of the present invention, the first transmission assembly 11 and the second transmission assembly 12 are arranged on opposite sides with respect to said longitudinal plane PL. With reference to FIG. 4, in a rear observation plane of the motorcycle 1, the first transmission assembly 11 is located transversally to the left, i.e. in the left half-plane SS, where this half-plane is identified by the longitudinal plane PL. In the illustrated embodiment, the electric machine 20 and the second transmission assembly 12 are instead arranged transversely to the right, i.e. in the right half-plane SD opposite the left half-plane SS.

According to a possible embodiment, visible in the figures, the rotation axis 102 (indicated in FIG. 5) of the rotor 21 of the electric machine 20 is placed in an offset position, in particular set back (i.e. rear) with respect to the rotation axis 101 of the drive wheel 2. In this regard, in the side view of FIG. 3, the reference PR1 indicates a first plane containing the rotation axis 101 of the drive wheel 2, while the reference PR2 indicates a second plane containing the rotation axis 102 of the rotor of the electric machine 20. With respect to the front-rear direction FB, the first plane PR1 therefore remains included between the plane PR2 and a third plane PRX containing the axis X around which the motor oscillates with respect to the frame 50. In particular, the planes PR1, PR2 and PRX are parallel to each other. This arrangement allows for example a muffler 66 of the motorcycle 1 to be installed in a position that, in the lateral plane of FIG. 3, is substantially included between the planes PR2 and PRX just defined above. According to a possible embodiment (visible in particular in FIGS. 6 and 7), the second transmission assembly 12 comprises a plurality of gear wheels 12A, 12B, 12C which as a whole define a reduction unit in accordance with the purposes already indicated above. At least one first gear wheel 12A is integral with the rotor R of the electric machine 20, while at least one other gear wheel 12C is coaxial with the rotation axis 101 of the drive wheel 2. In the case illustrated in the figures, a transmission gear 12B is provided and comprising a transmission wheel 12' and a pinion 12" coaxial and integral with each other. The transmission wheel 12' engages the first gear wheel 12A, while the pinion 12" engages the gear wheel 12C coaxial with the rotation axis 101 of the drive wheel 2. Alternative gear wheels, both in number and in size, can be provided in the second transmission assembly 12.

According to a preferred embodiment, visible in the figures, the motorcycle 1 comprises a support bracket 70 that is connected to the thermal engine block 10 so as to swing with it around the frame 50. The term "block" is intended to generically indicate the structure that contains the thermal engine 10 and/or the first transmission assembly 11. As shown in the figures, the support bracket 70 preferably supports the electric machine 20 and the second transmission assembly 12. In other words, the support bracket 70 supports the components (stator 21-rotor 22) constituting the electric machine 20 and at the same time defines the supports for the components of the second transmission assembly 12.

In particular, the support bracket 70 extends longitudinally starting from the engine block at least until, and in particular beyond, the rotation axis 101 of the drive wheel 2. The support bracket 70 therefore forms a support for the pin 200 of the drive wheel and at the same time a support for the electric machine 20. Preferably, the support bracket 70 comprises a housing seat 12*d* for the drive wheel pin 200, so as to support it in a rotatable manner.

Preferably, the support bracket 70 is made in one piece.

Advantageously, since the rotation axis 102 of the electric machine 20 is offset by a predetermined distance d (FIG. 2) with respect to the rotation axis 101 of the drive wheel 2, the electric machine 20, by varying the shape of the support bracket 70, can assume any angular position of 360° around the rotation axis 101 of the drive wheel 2. In FIG. 3 a possible alternative position of the electric machine 20 is shown with a dashed line.

In terms of design, therefore, the electric machine 20 can be arranged in a more advantageous angular position. For example, it can be positioned higher or lower with respect to the wheel axis 101 depending on the dimensions present on the motorcycle, or again to optimize the distribution of the weights of the motorcycle or for other correlated technical aspects. The modification of the angular position of the electric machine 20 implies a modification of the support bracket 70 only and not of the transmission system 12.

According to a preferred embodiment, the support bracket 70 is configured in such a way as to also support the muffler 66 of the motorcycle 1. In this regard, the electric machine 20 is preferably arranged in the same half-plane as the muffler 66. In other words, the muffler 66, the second transmission assembly 12 and the electric machine 20 are located in a half-plane (SD in the figures) which is different from the half-plane (SS in the figures) in which the first transmission assembly 11 is arranged for connecting the thermal engine 10 to the drive wheel 2 (see FIGS. 4 and 5). For the purposes of the invention, the half-planes SS and SD are in any case identified by the longitudinal plane PL defined above.

With reference to FIGS. 3 and 4, the muffler 66 and the electric machine 20 are supported by the support bracket 70 in such a way that the exhaust (or exhausts) of the muffler 66 are placed at a higher height with respect to that of the electric machine 20, wherein such height is evaluated with respect to the support surface PO of the motorcycle 1.

Figure 6:
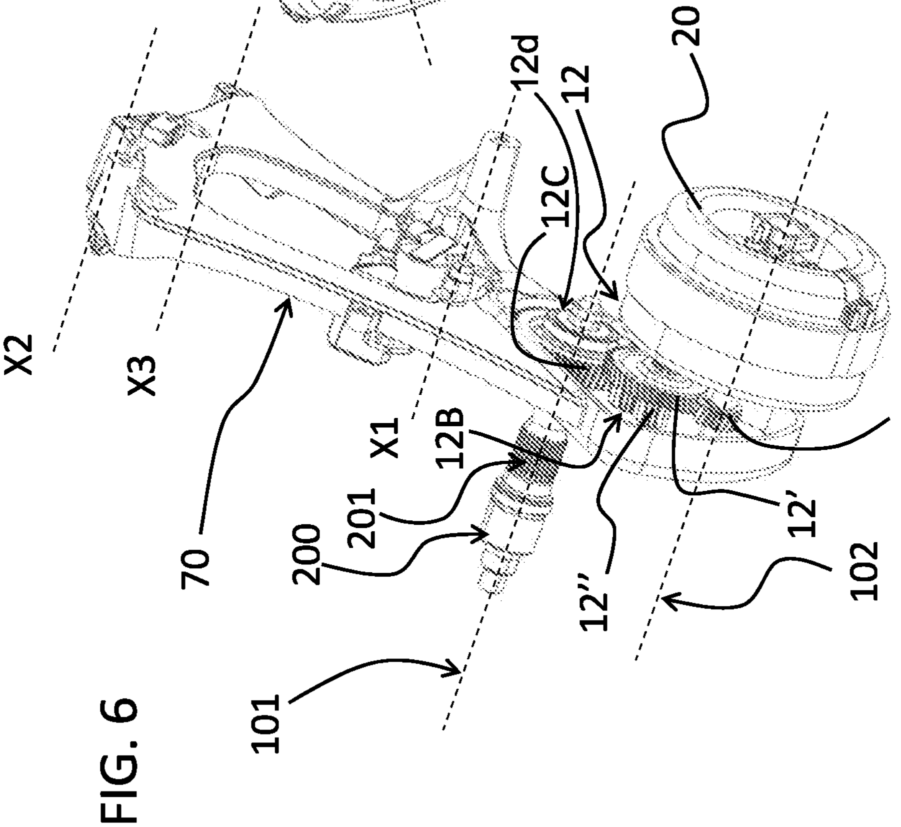

FIGS. 5 and 6 show a possible, therefore non-exclusive, embodiment of a support bracket 70 which can be used to support the electric machine 20 and/or the muffler 66 in accordance with the purposes just indicated above. The support bracket 70 is rigidly connected (for example through connecting screws) to the engine block so as to follow its oscillations around the axis X. In this regard, in FIGS. 6 and 7 the references X2 and X3 indicate the connection axes (axis of the connecting screws) with the engine block, while the references X1 and X1' indicate the connection axes with the muffler 66.

Figure 7:
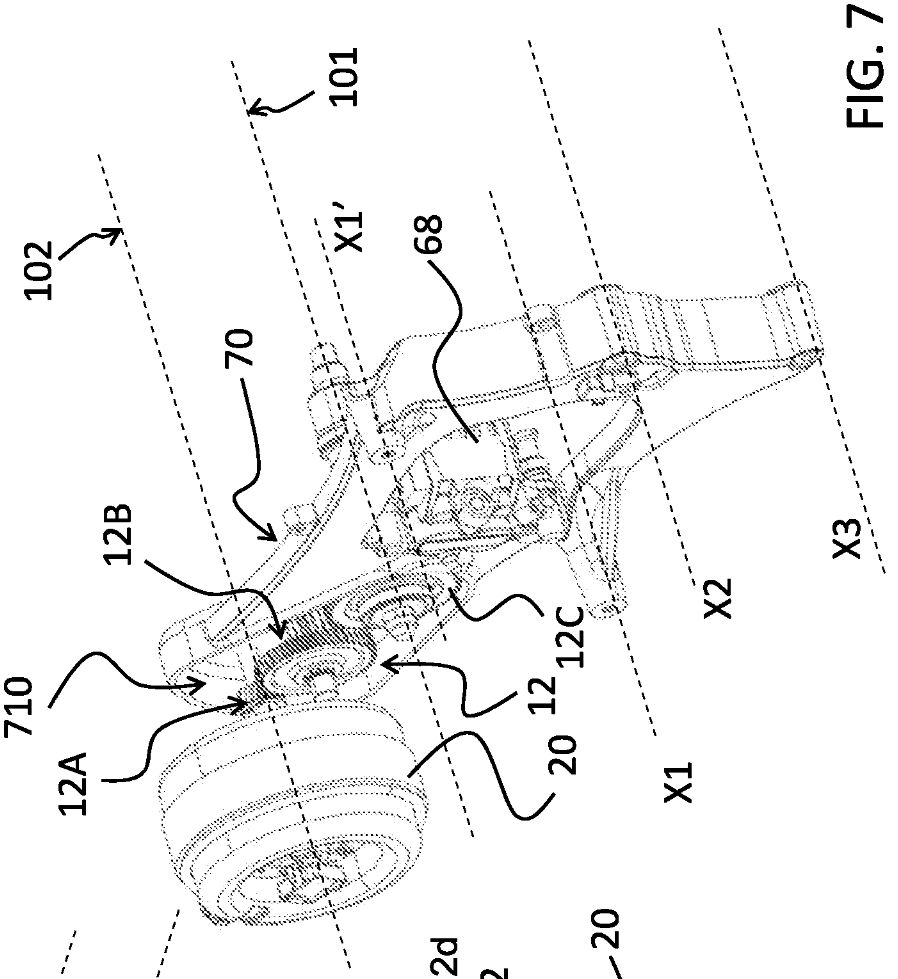
FIGS. 6 and 7 are exploded views relating to a group of components of the saddle-ride vehicle of FIG. 3.

According to a possible embodiment visible in FIGS. 6 and 7, the support bracket 70 defines a seat 710 in which the second gear transmission 120 constituting the second transmission assembly 12 is located. In order to show the gear wheels 12A, 12B, 12C constituting the second gear transmission 120, FIGS. 6 and 7 do not show the casing that closes the seat 710 on a first side on which the electric machine 20 is located. FIGS. 6 and 7 instead show the pin 200 which is connected, at opposite sides, to the first transmission assembly 11 and to the second transmission assembly 12. The pin 200 is also shaped to receive, at a grooved profile 201, the drive wheel 2.

Again with reference to FIGS. 6 and 7, the support bracket 70 is preferably configured in such a way as to support a brake calliper 68 of the drive wheel 2 or the set of components which as a whole intervene on the drive wheel 2 to brake it, according to a widely known principle. According to another aspect, the motorcycle 1 comprises a control unit 40 configured to control the propulsion unit 3. More precisely, the control unit 40 is configured to control the electric machine 20 and an actuator responsible for regulating the position of the throttle valve of the thermal engine 10 in response to input signals indicating the operating conditions of the propulsion unit 3. Preferably, the control unit 40 commands the propulsion unit 3 on the basis of a first signal S1 relating to the position of the accelerator grip 42, a second signal S2 indicating the position of the brake lever 43 and a third signal deriving from a selection device 44, arranged on the panel of the motorcycle 1 to select the operating mode in which the propulsion unit operates. In this regard, the propulsion unit 3 can operate according to:

a first "thermal" mode whereby propulsion takes place only through the combustion engine;

a second "electric" mode in which the propulsion is provided solely by the electric machine 20 operating as an electric motor;

a third "parallel hybrid" mode in which the internal combustion engine 10 and the electric machine 20 both supply driving torque to the drive wheel 2.

It is also possible that the propulsion unit, when operating in electric mode, supplies torque to the drive wheel 2 in a reverse direction of rotation, so as to perform the reverse gear function of the motorcycle 1.

Thus, the selection device 44 will comprise at least three user-selectable keys each for selecting a corresponding operating mode.

The motorcycle according to the invention allows the intended tasks and purposes to be fully accomplished. In particular, the two transmission assemblies 11, 12 can advantageously be assembled/installed on different lines or in any case independently of each other with evident advantages in terms of production). Furthermore, the physical separation of the two assemblies allows the most suitable transmission ratios to be established for optimizing the operation of the thermal engine and the electric one.

The invention claimed is:

1. A saddle-ride motorcycle comprising:

at least one drive wheel and a hybrid-type propulsion unit; wherein the propulsion unit comprises:

a thermal combustion engine including a drive shaft;

a first transmission assembly that mechanically connects the drive shaft to the at least one drive wheel;

an electrical machine configured to be driven independently or in combination with the thermal combustion engine; and a second transmission assembly that mechanically connects a rotor of the electrical machine to the at least one drive wheel, wherein the second transmission assembly is separated from the first transmission assembly; wherein a support bracket is configured to support the drive wheel in a rotatable manner, the electrical machine being mounted on the support bracket;

wherein a rotation axis of the rotor of the electrical machine is parallel to, and placed in an offset position with respect to, a rotation axis of the at least one drive wheel;

wherein the rotation axis of the rotor is placed in a rear position with respect to the rotation axis of the at least one drive wheel.

2. The motorcycle of claim 1, wherein a first plane containing the rotation axis of the at least one drive wheel, a second plane containing the rotation axis of the rotor of the electrical machine and a third plane containing an axis around which the motor swings with respect to a frame are defined, wherein the first plane is comprised between the second plane and the third plane.

3. The motorcycle of claim 1, wherein the support bracket is configured to further support a muffler.

4. The motorcycle of claim 1, wherein the first transmission assembly comprises a continuously variable transmission (CVT) connecting the drive shaft to a transmission shaft, wherein the CVT comprises a drive pulley and a driven pulley, respectively connected to the drive shaft and the transmission shaft, the first transmission assembly comprising a clutch operatively interposed between the driven pulley and the transmission shaft.

5. The motorcycle of claim 1, wherein the first transmission assembly comprises a gear transmission that connects the drive shaft to the at least one drive wheel.

6. The motorcycle of claim 1, wherein the second transmission assembly comprises a second gear transmission.

7. The motorcycle of claim 6, wherein the support bracket defines a seat in which the second gear transmission is housed.

8. The motorcycle of claim 1, wherein the first transmission assembly and the second transmission assembly are arranged on opposite sides with respect to a longitudinal plane of the motorcycle.

9. The motorcycle of claim 1, wherein the first transmission assembly develops a transmission ratio, between the drive shaft and the at least one drive wheel, different from a transmission ratio developed by the second transmission assembly between the rotor of the electrical machine and the at least one drive wheel.

10. The motorcycle of claim 1, wherein the electrical machine is reversible and is connected to a battery of the motorcycle to charge the battery in a mode of operation of the electrical machine.

11. A saddle-ride motorcycle comprising:

at least one drive wheel and a hybrid-type propulsion unit; wherein the propulsion unit comprises:

a thermal combustion engine including a drive shaft;

a first transmission assembly that mechanically connects the drive shaft to the at least one drive wheel;

an electrical machine configured to be driven independently or in combination with the thermal combustion engine; and a second transmission assembly that mechanically connects a rotor of the electrical machine to the at least one drive wheel, wherein the second transmission assembly is separated from the first transmission assembly; wherein a support bracket is configured to support the drive wheel in a rotatable manner, the electrical machine being mounted on the support bracket;

wherein a rotation axis of the rotor of the electrical machine is parallel to, and placed in an offset position with respect to, a rotation axis of the at least one drive wheel;

wherein a first plane containing the rotation axis of the at least one drive wheel, a second plane containing the rotation axis of the rotor of the electrical machine and a third plane containing an axis around which the motor swings with respect to a frame are defined, wherein the first plane is comprised between the second plane and the third plane.

12. The motorcycle of claim 11, wherein the support bracket is configured to further support a muffler.

13. The motorcycle of claim 11, wherein the first transmission assembly comprises a continuously variable transmission (CVT) connecting the drive shaft to a transmission shaft, wherein the CVT comprises a drive pulley and a driven pulley, respectively connected to the drive shaft and the transmission shaft, the first transmission assembly comprising a clutch operatively interposed between the driven pulley and the transmission shaft.

14. The motorcycle of claim 11, wherein the first transmission assembly comprises a gear transmission that connects the drive shaft to the at least one drive wheel.

15. The motorcycle of claim 11, wherein the second transmission assembly comprises a second gear transmission.

16. The motorcycle of claim 15, wherein the support bracket defines a seat in which the second gear transmission is housed.

17. The motorcycle of claim 11, wherein the first transmission assembly and the second transmission assembly are arranged on opposite sides with respect to a longitudinal plane of the motorcycle.

18. The motorcycle of claim 11, wherein the first transmission assembly develops a transmission ratio, between the drive shaft and the at least one drive wheel, different from a transmission ratio developed by the second transmission assembly between the rotor of the electrical machine and the at least one drive wheel.

19. The motorcycle of claim 11, wherein the electrical machine is reversible and is connected to a battery of the motorcycle to charge the battery in a mode of operation of the electrical machine.

* * * * *